April 15, 1958     F. P. MIXON     2,830,520
TILLER

Filed Jan. 7, 1954     2 Sheets-Sheet 1

Floyd P. Mixon
INVENTOR.

BY *Clarence A. O'Brien*
*and Harvey B. Jacobson*
Attorneys

April 15, 1958 — F. P. MIXON — 2,830,520
TILLER
Filed Jan. 7, 1954 — 2 Sheets-Sheet 2
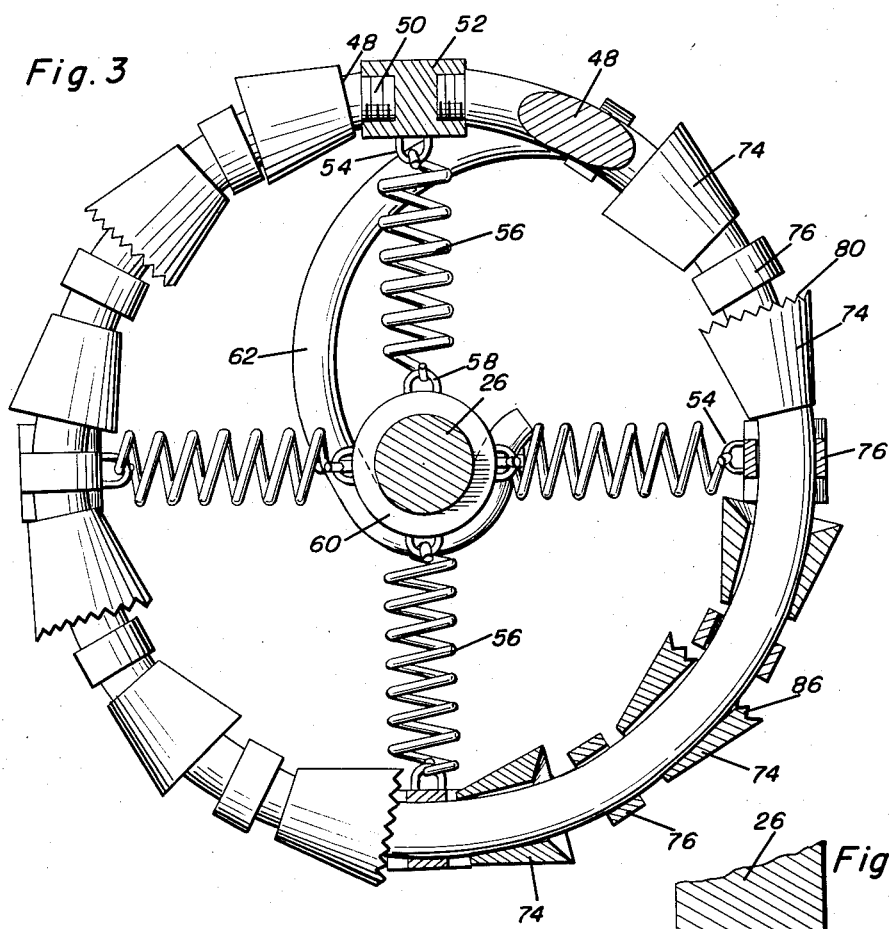
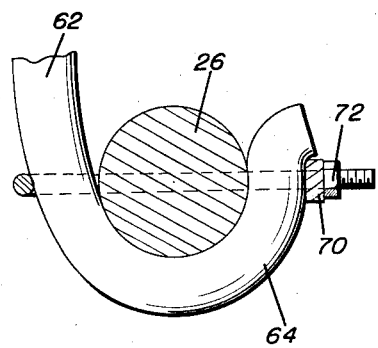
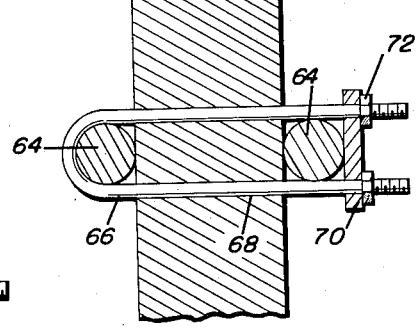
Floyd P. Mixon
INVENTOR.

2,830,520

TILLER

Floyd P. Mixon, Seattle, Wash.

Application January 7, 1954, Serial No. 402,707

3 Claims. (Cl. 97—219)

This invention relates to a tiller and more specifically provides a device for pulverizing the soil in a more efficient and effective manner.

An object of this invention is to provide a tiller having a novel soil pulverizing means wherein the soil is agitated in a more efficient manner with less breakage of the tiller due to contacting of stumps, rocks or the like.

Another object of this invention is to provide a tiller which is simple in construction, easy and efficient in operation, rugged, safe, well adapted for the purposes for which the same is intended and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 3 is a transverse, vertical section taken substantially along section 3—3 of Figure 1 showing the details of construction of the spiral rotating elements;

Figure 4 is a detail section showing the manner of attaching the spiral member to the transverse axle or shaft;

Figure 5 is a top plan section taken substantially along section line 5—5 of Figure 2 showing further details of the attachment of the spiral member to the transverse shaft;

Figure 1:
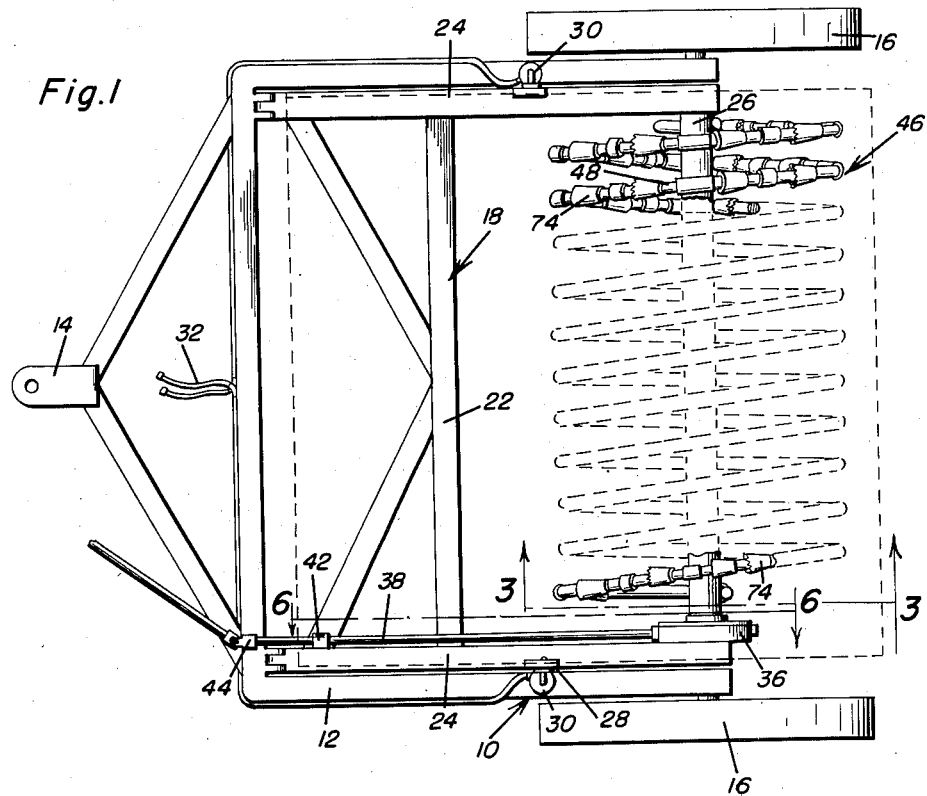
Figure 1 is a top plan view of the tiller of this invention.
Figure 2:
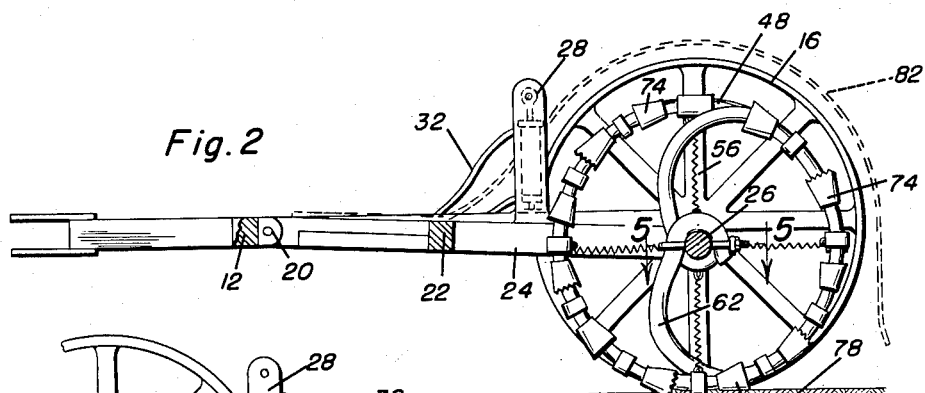
Figure 2 is a side elevation with portions of the frame broken away showing details of constructions of the rotating elements.
Figure 6:
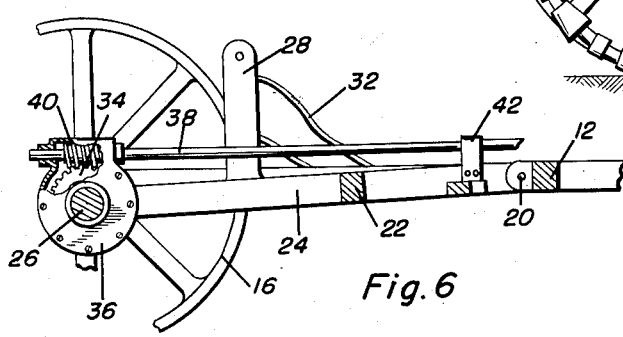
Figure 6 is a vertical section taken substantially along section line 6—6 of Figure 1 showing the details of contruction of the drive means and framework.

Referring now specifically to the drawing, it will be seen that the numeral 10 generally designates the tiller of this invention including a generally U-shaped frame 12 having a hitch 14 connected to its forward portion. The remote end of the legs of the U-shaped frame are each provided with a ground engaging supporting wheel 16 journalled thereon by any conventional means. A carrier generally indicated by the numeral 18 is pivotally secured to the frame 12 by the pivot pin 20 and includes a cross member 22 and a pair of leg members 24 which are parallel to the legs of the U-shaped member 12. The carrier 18 is generally U-shaped and is disposed within the U-shaped frame 12. Journalled at the remote end of the leg member 24 is a shaft or axle 26 which is generally parallel to the axis of rotation of the ground engaging wheel 16. The shaft 26 is journaled on the legs 24 by suitable bearings, the details of which are not shown. Each of the legs 24 is provided with a vertically elongated upstanding lug 28 spaced midway between the pivot pins 20 and the shaft 26 and a hydraulic cylinder and piston arrangement 30 is pivotally connected to the upper end of the lug 28 at one end and pivotally connected to one of the legs of the U-shaped frame 12 at its lower end. Suitable hydraulic pressure lines 32 interconnect the hydraulic cylinders and pistons 30 with the hydraulic pump of a tractor (not shown). By suitable manipulation of the hydraulic system of the tractor, the relative position of the carrier 18 and the frame 12 may be adjusted. A pinion gear 34 is secured to and is rigid with the shaft 26 adjacent to one end thereof along one side of the leg members 24. The pinion 34 is encased in a suitable housing 36 which rotatably journals the end of the shaft 38 having a worm gear 40 secured thereto in meshing engagement with the pinion gear 34. The shaft 38 extends forwardly of the carrier 24 and is journalled on suitable bearings 42 and then extends forwardly of the frame 12 through a universal joint for connection to and actuation by the power take-off of the tractor (not shown). It will be understood that the shaft 38 rotates the worm gear 40 thereby rotating the pinion gear 34 and the shaft 26.

A spiral rod generally indicated by the numeral 46 is secured to the shaft 26 and surrounds the shaft 26 in spaced relation thereto. The spiral rod 46 is constructed of a plurality of sections as indicated by the numeral 48 in Figure 3. The adjacent end portions of each of the spiral sections 48 are threaded as indicated by the numeral 50 and the threads on one end are opposite to the threads on the other end and the two ends of adjoining section 48 are connected by a socket member 52 having oppositely threaded bores in the opposite ends thereof. This permits the socket 52 to be turned in a single direction for rigidly securing adjacent ends 50 of adjacent sections 48 together thereby forming a continuous spiral member 46. Each of these connectors 52 is provided with a loop ring 54 on the periphery thereof and a tension coil spring 56 is disposed between loop 54 and an attaching loop 58 secured to a ring 60 on the shaft 26. Remote end sections 48 of the spiral 46 are provided with an inwardly curved portions 62 which has a U-shaped end portion 64 surrounding a portion of the shaft 26. A U-shaped bolt 66 has a bight portion thereof surrounding one part of the U-shaped portion 64 and the legs thereof projecting through bores 68 in the shaft 26 and positioned on opposite sides of the remote end of the U-shaped portion 64 in the inwardly curved portion 62 of the spiral 46. A connecting link 70 is positioned over the free ends of the U-shaped bolt 66 and suitable fastening nuts 72 are provided thereon for securely tightening the U bolt 66 about the U-shaped portion 64 and securing the curved member 62 to the shaft 26. Loosely disposed on the spiral 46 is a plurality of conical cutters 74 and spacers 76 wherein the conical cutters 74 have a major diameter which engages the ground surface generally indicated by the numeral 78. It will be seen that alternate cutters 74 are provided with teeth 80 along the edge forming the major axis thereof for more efficient agitating of the soil. As indicated by the numeral 82, a suitable cover or shield is provided over the rotating spiral member 46 thereby preventing anyone from accidentally becoming injured by the rotating cutters 74.

The operation of the device will be readily understood. The spiral member 46 rotates and engages the soil 78 with the cutter members 74 thereby pulverizing and agitating the soil in the preferred manner. Upon striking a rock, stump or the like, the inherent resiliency of the spiral rod 46 supported at its ends on the inturned member 62 and at the center by the coil springs 56 permits the spiral member 46 to ride over obstructions such as stones or stumps. The spacers 76 some of which secure the tension springs 56 and the cutters 74 co-act in such a manner as to agitate the soil and it will be seen that in the event a portion of the spiral number 46 becomes damaged, the device may be readily repaired by removal and replacement of the damaged section.

Obviously, the angular relation of the carrier 18 and frame 12 may be adjusted by the hydraulic cylinder and piston arrangement 30 for raising the spiral number 46 out of contact with the ground 78 for transportation of the vehicle as desired. As specifically shown, the rotating element 46 is driven through a power take-off shaft 38 from the tractor and the cylinders 30 are operated through a hydraulic pressure line 32. However, the device may be adjusted and driven by any suitable drive means and adjusting means as may become desirable in manufacture.

What is claimed as new is as follows:

1. In a tiller having a frame, a ground engaging wheel rotatably supported on opposite sides of said frame, hitch means on the forward end of said frame, a carrier mounted on said frame having laterally spaced side members, a shaft extending between said side members and rotatably journalled thereon; the improvement comprising a spiral rod adapted to encircle the shaft in spaced relation and secured thereto, and a plurality of cutters mounted on said rod for tilling the soil, said cutters being arcuately spaced on said rod, said cutters being journalled on said rod and generally frusto-conical in shape with the major diameter forming the cutting edge.

2. A rotary cultivator tool comprising a rotatable shaft, a sectional spiral rod having inturned ends, connecting means joining the adjacent ends of adjacent sections of said spiral rod, means for attaching the inturned ends of said spiral rods to the shaft, a plurality of cutters mounted on said spiral rod, and spacers between adjacent cutters for retaining said cutters in spaced relation, said cutters and spacers being removably positioned on said spiral rod, said spacers and cutters being tubular and loosely received on said rod, said cutters being frusto-conical in shape with the larger end thereof being disposed in the direction of rotation of the spiral rod, said larger end forming a cutting edge for tilling the soil.

3. A rotary cultivator tool comprising a rotatable shaft, a sectional spiral rod having inturned ends, connecting means joining the adjacent ends of adjacent sections of said spiral rod, means for attaching the inturned ends of said spiral rod to the shaft, a plurality of cutters mounted on said spiral rod, and spacers between adjacent cutters for retaining said cutters in spaced relation, said cutters and spacers being removably positioned on said spiral rod, said spacers and cutters being tubular and loosely received on said rod, said cutters being frusto-conical in shape with the larger end thereof being disposed in the direction of rotation of the spiral rod, said larger end forming a cutting edge for tilling the soil, and spring means interconnecting the shaft and each section of the spiral rod for cushioning the spiral rod in relation to the shaft.

References Cited in the file of this patent

UNITED STATES PATENTS

| | | |
|---|---|---|
| 503,006 | Sexson | Aug. 8, 1893 |
| 701,512 | Scott | June 3, 1902 |
| 1,045,863 | Lynch | Dec. 3, 1912 |
| 1,135,305 | Linderblad | Apr. 13, 1915 |
| 1,268,150 | Reed | June 4, 1918 |
| 1,637,098 | Barnes | July 26, 1927 |
| 1,718,564 | Kietzke | June 25, 1929 |
| 1,870,932 | Sternemann | Aug. 9, 1932 |
| 2,503,317 | Bergquist | Apr. 11, 1950 |

FOREIGN PATENTS

| | | |
|---|---|---|
| 249,960 | Germany | Aug. 2, 1912 |